United States Patent
Lee (10) Patent No.: US 7,477,035 B2
(45) Date of Patent: Jan. 13, 2009

(54) DYNAMIC APERTURE DRIVING APPARATUS AND METHOD FOR REDUCING VIBRATION

(75) Inventor: Chil-Sung Lee, Suwon-si (KR)

(73) Assignee: Samsung Electro-Mechanics Co., Ltd, Suwon-si (KR)

( * ) Notice: Subject to any disclaimer, the term of this patent is extended or adjusted under 35 U.S.C. 154(b) by 531 days.

(21) Appl. No.: 11/340,626

(22) Filed: Jan. 27, 2006

(65) Prior Publication Data
US 2006/0208684 A1    Sep. 21, 2006

(30) Foreign Application Priority Data
Mar. 16, 2005    (KR) .................. 10-2005-0021637

(51) Int. Cl.
*G02B 9/00*    (2006.01)
(52) U.S. Cl. .................. 318/480; 353/97; 359/738; 359/739
(58) Field of Classification Search ................. 318/480; 359/738, 739, 740; 353/97
See application file for complete search history.

(56) References Cited

U.S. PATENT DOCUMENTS

| | | | |
|---|---|---|---|
| 4,078,861 A * | 3/1978 | Bohme ................. | 353/97 |
| 6,999,245 B1 * | 2/2006 | Choi ................. | 359/738 |
| 7,344,255 B2 * | 3/2008 | Hara et al. ................. | 353/88 |
| 7,364,309 B2 * | 4/2008 | Sugawara et al. ............ | 353/85 |
| 2005/0001997 A1 | 1/2005 | Kawaai et al. | |

OTHER PUBLICATIONS

Chinese Office Action dated Jun. 6, 2008 issued in CN 2006-100031700.

* cited by examiner

*Primary Examiner*—Bentsu Ro
*Assistant Examiner*—Thai Dinh
(74) *Attorney, Agent, or Firm*—Stanzione & Kim, LLP (57) ABSTRACT

The present invention generally relates to a dynamic aperture for controlling the intensity of light of projection lens, more particularly to a dynamic aperture driving apparatus and method for reducing vibration by which vibrations are minimized in spite of command for sudden location change. The dynamic aperture driving apparatus comprises rotating means, driving means, sensing means and driving control means, whereas a location control signal is characterized by minimizing vibration when the rotating means arrives at a commanded location by an increase in rising time and/or falling time of a target location signal through an RC integral circuit within the driving control means.

8 Claims, 9 Drawing Sheets

DYNAMIC APERTURE DRIVING APPARATUS AND METHOD FOR REDUCING VIBRATION

CROSS-REFERENCE TO RELATED APPLICATIONS

This application claims the benefit of Korean Patent Application No. 2005-21637 filed with the Korea Industrial Property Office on Mar. 16, 2005, the disclosure of which is incorporated herein by reference.

BACKGROUND OF THE INVENTION

1. Field of the Invention

The present invention generally relates to a dynamic aperture for controlling the intensity of light of projection lens, more particularly to a dynamic aperture driving apparatus and a method for reducing the vibration by which vibrations are minimized in spite of command for sudden location change.

2. Description of the Related Art

Recently, projection TVs and projectors are increasingly popular as a display device with a large, high-definition screen. The projection TV and projector are driven according to the principles of optics, and FIG. 1 is a diagram illustrating an optical structure of these kinds of projection TVs and projectors.

Figure 1:
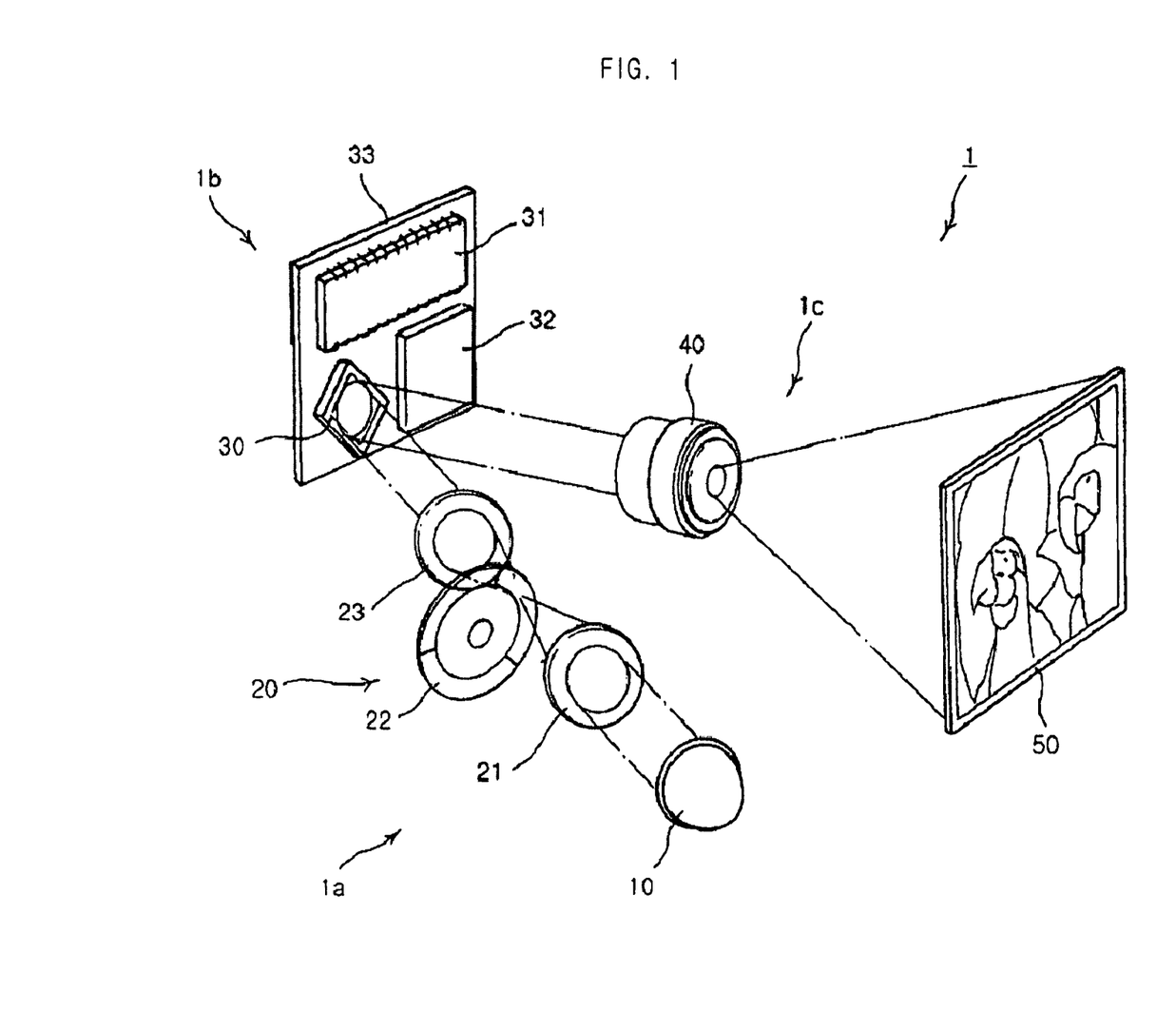
FIG. 1 is a diagram illustrating an optical structure of a typical projection device.

Referring to FIG. 1, a projection device comprises an illuminating optical system 1a, a reflection type display element 1b and a projection optical system 1c.

The illuminating optical system 1a is a part that generates light, and comprises a lamp generating light (not illustrated), a light source 10 having a mirror to reflect the generated light and guide a path and an optical lens 20 to illuminate the incident light from the light source 10 to the reflection type display element 1b.

The reflection type display element 1b reflects the incident light from the illuminating optical system 1a in units of pixels according to provided images, and comprises DMD (Digital Micromirror Device) 30, which is a projection type display device using semiconductors to control light. DMD 30 is mounted on a substrate 33 having a processor 31 and a memory 32, and divides the light path of an illuminating optical system 1a and one of the projection optical systems 1c corresponding to a tilt angle.

The projection optical system 1c projects the reflected images through the reflection type display element 1b on a screen 50, and comprises a projection lens module 40, enlarging the images transferred from DMD 30 and projecting on the screen 50.

Figure 2:
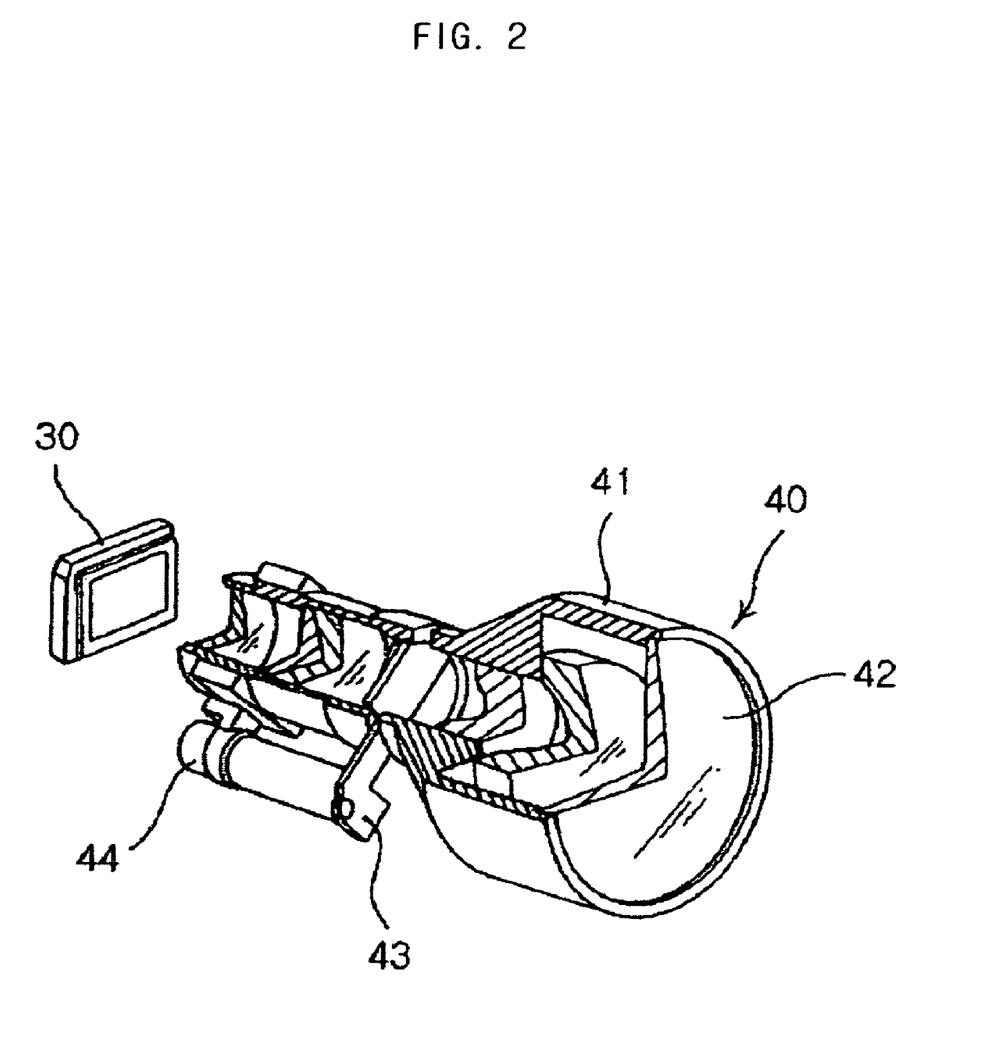
FIG. 2 is a diagram illustrating the structure of an optical apparatus of a projection optical system of the projection apparatus shown in FIG. 1.

Here, as illustrated in FIG. 2 the projection lens module 40 comprises a plurality of projection lenses 42, which are arrayed successively in a barrel 41 along the axis of light, and enlarges the incident images from DMD 30 in order to form clearly on the screen 50 spaced at a specific distance.

At this time, an aperture 43 to control the intensity of light is equipped within the plurality of projection lenses 42, and controls the intensity of light such that a projected image has a proper contrast ratio. At this time, for precisely controlling a contrast ratio, the location of the aperture 43 must be controlled in high resolving power having many steps in a certain arbitrary angle (30 degrees, for example). For a precise control of the location, a voice coil motor (hereinafter, VCM) 44 is typically used to rotate the aperture 43.

Figure 3:
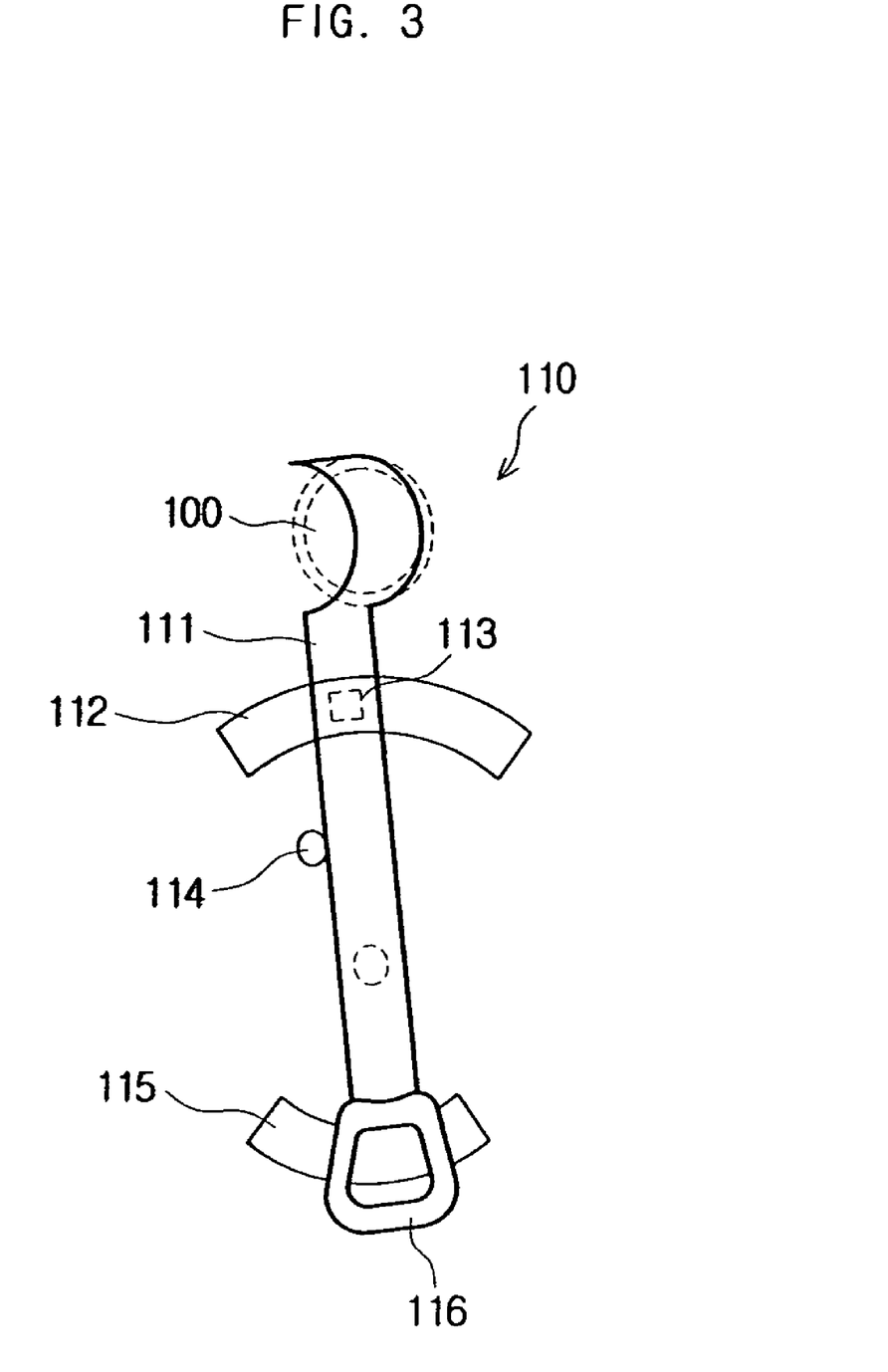
FIG. 3 and FIG. 4 are diagrams briefly illustrating a conventional dynamic aperture driving apparatus.

FIG. 3 is a diagram briefly illustrating a conventional dynamic aperture driving apparatus. Referring to FIG. 3, a conventional dynamic aperture driving apparatus comprises rotating means, driving means, sensing means and driving control means.

The rotating means comprises a pivot 111 which is embodied in one body with the aperture of the dynamic aperture driving apparatus 110 to rotate from one side to the other side in a given angle.

The driving means comprises a driving magnet 115 located on the rotation path of the other end of the pivot 111 and a driving coil 116 which is equipped in the lower end of the pivot 111 to face the driving magnet 115 and rotates the pivot 111 according to the magnitude of the driving current by the electro-magnetic effect with the driving magnet 115. Here, the driving means generally comes under VCM.

The sensing means comprises a sensor magnet 112 of providing different magnetic intensity according to each rotating angle of the pivot 111 and a hall sensor 113, rotating in one body with the pivot 111 and converting the magnetic intensity provided by the sensor magnet 112 to an electric signal.

The driving control means inputs a current to the driving coil 116, rotating the pivot 111, detects the present location of the pivot 111 through the sensor magnet 112 and the hall sensor 113, and feedback-controls the pivot 111 to move to the commanded location.

A dynamic aperture driving apparatus can additionally comprise a stopper 114 installed in the limit location of the rotating range of the pivot 111 to stop the pivot 111 that rotates over the critical value.

Figure 4:
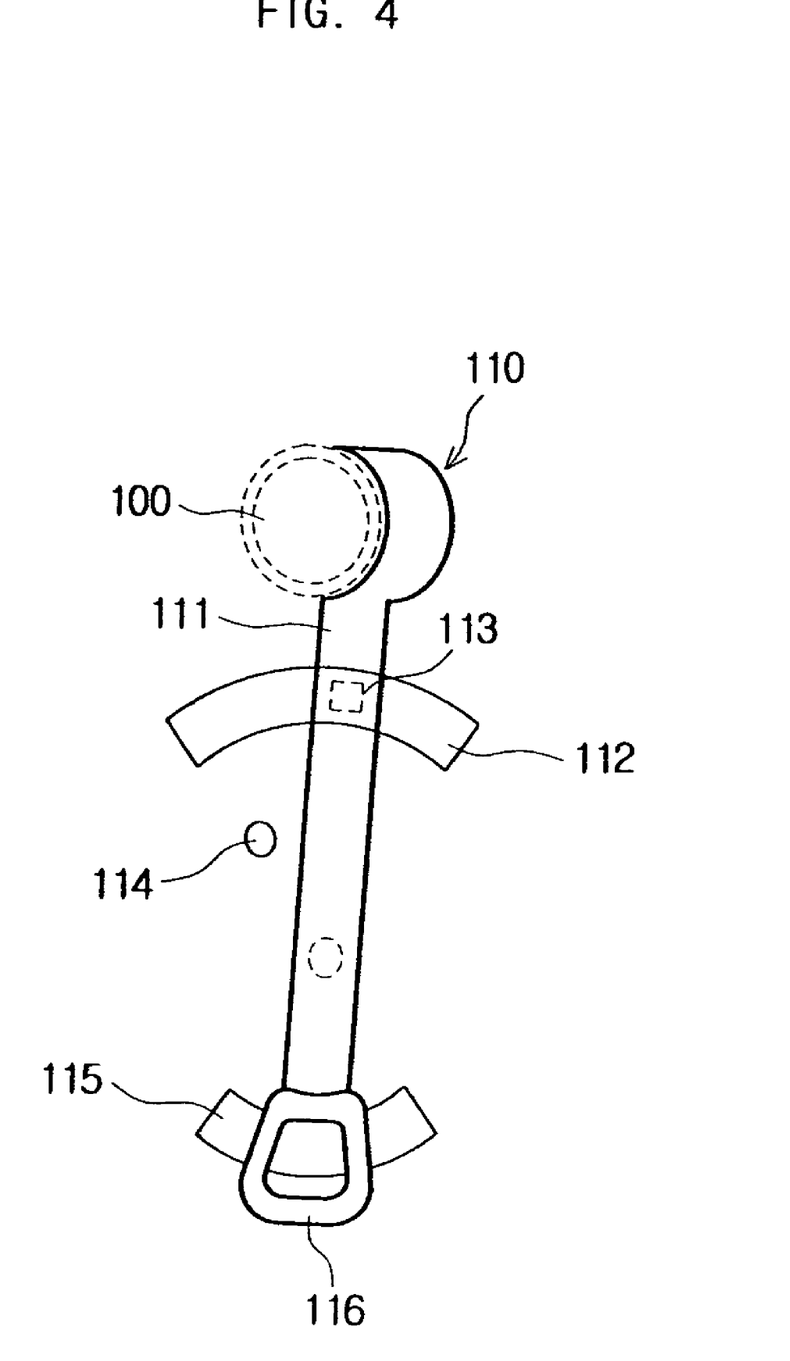

The process of detecting the location of dynamic aperture is as follows: As illustrated in FIG. 3, in the state that a current is not inputted in the driving coil 115, the rotating means 111 is in a stopped state by the stopper 114, and the output of the hall sensor 113 at this time is taken as a standard value. Then, as illustrated in FIG. 4, if the rotating means 111 rotates by an angle according to the commanded location, the output of the hall sensor 113 is changed, and the rotating angle of the rotating means 111 is calculated from the difference between the standard value in the stopped state and the present output of the hall sensor 113.

This dynamic aperture is usually equipped in an optical apparatus and controls the intensity of incident light. The operative principle is as follows: The dynamic aperture divides the range of light incident angle equally into 256 parts and controls the location from step 0 to step 255 based on the PWM duty signal corresponding to an image signal. Step 0 allows the least intensity of incident light by covering the most range of the incident light domain 100, as illustrated in FIG. 3, and step 255 allows the most intensity of incident light by covering the least range of the incident light domain 100, as illustrated in FIG. 4. The roles of step 0 and step 255 can also be reversed.

Meanwhile, as the conversion cycle of the PWM duty signal becomes shorter, the response time must respond to the speedier conversion. For example, in the case of displaying a lightning scene on the screen of a projection TV, the dynamic aperture must move back and forth between step 0 and step 255 in an extremely short time.

As the location changes in a very short time, a reverse current is flowed in the driving coil 116 and does breaking to allow a quick response with no overshoot. At this time, a maximum instant vibration occurs, and the generated vibration is converted to noise in the optical apparatus, which is a major shortcoming of a projection TV.

SUMMARY OF THE INVENTION

Thus, in order to solve aforementioned problems, the present invention aims to provide a dynamic aperture driving apparatus and a method for reducing vibration in which vibration is not generated when the control input is a pulse.

Another objective of the present invention is to provide a dynamic aperture driving apparatus and a method for reducing vibration that diminish noise in the projection TV by reducing vibration.

Additional aspects and advantages of the present general inventive concept will be set forth in part in the description which follows and, in part, will be obvious from the description, or may be learned by practice of the general inventive concept.

The foregoing aspects of the present invention are achieved by providing a dynamic aperture driving apparatus for controlling the intensity of incident light by rotating a dynamic aperture, said dynamic aperture driving apparatus comprising rotating means, the upper end of which is connected with said dynamic aperture to rotate from one side to the other side in a predetermined rotating angle; driving means for rotating said rotating means from one side to the other side according to a predetermined electric signal; sensing means for detecting a current location of said rotating means; and driving control means for comparing a target location corresponding to an inputted target location signal with said current location detected by said sensing means and making a location control signal control said driving means such that said rotating means reaches the target location, wherein said driving control means increases a rising time and falling time of the target location signal, according to a speed of said rotating means set up to keep vibrations produced by rotation of said rotating means below a certain level.

Preferably, said driving means may comprise a driving coil formed in one body with said rotating means and in which the location control signal generated by said driving control means is inputted; and a driving magnet installed with a gap from said driving coil.

Furthermore, said driving control means may comprise a signal converting part for converting a value of the current location detected by said sensing means to a voltage signal; an RC integral circuit for increasing the rising time and falling time of the inputted target location signal; a first operating part for calculating a deviation by comparing the target location corresponding to the target location signal of which the rising time and falling time increase through said RC integral circuit with the current location inputted from said signal converting part; a torque converting part for converting an output signal of said first operating part to a torque control value; a second operating part for subtracting a feedback value of the location control signal from an output value of said torque converting part; a signal amplifying part for amplifying an output of said second operating part; an H-bridge for rectifying an output signal of said signal amplifying part and inputting the output signal to said driving coil; and a signal detecting part for providing the output signal on said driving coil to said second operating part by feedback.

And preferably, said sensing means may comprise a sensor magnet placed parallel to a rotating route of said rotating means and providing a magnetic intensity which is changed linearly along the length direction of said sensor magnet and is different according to each rotating angle of said rotating means; and a hall sensor for rotating in one body with said rotating means and converting the magnetic intensity of said sensor magnet changed according to the rotating angle to an electric signal. Or said sensing means may comprise a sensor magnet placed to a predetermined location such that a gap between said rotating means and said predetermined location is changed by rotation of said rotating means and having a fixed magnetic intensity; and a hall sensor for rotating in one body with said rotating means and converting the magnetic intensity of said sensor magnet changed according to a rotating angle to an electric signal.

The foregoing another aspects of the present invention are achieved by providing a method for reducing vibration of a dynamic aperture driving apparatus comprising rotating means, the upper end of which is connected with a dynamic aperture to rotate from one side to the other side in a predetermined rotating angle, driving means for rotating said rotating means from one side to the other side according to a predetermined electric signal, sensing means for detecting a current location of said rotating means and driving control means for comparing a target location corresponding to an inputted target location signal with the current location detected by said sensing means to generate a location control signal controlling said driving means such that said rotating means reaches the target location, the method comprising (a) inputting the target location signal to said driving control means; (b) converting the target location signal to a signal a rising time and falling time of which increase through an RC integral circuit; (c) comparing a current location detected by said sensing means with the target location by the converted signal in said step (b) and generating the location control signal to control said driving means such that said rotating means reaches the target location; and (d) rotating said rotating means by said driving means according to the location control signal.

Preferably, said driving means may comprise a driving coil formed in one body with said rotating means to input said location control signal generated by said driving control means; and a driving magnet installed with a gap from said driving coil. And said step (c) may comprise (c-1) calculating a deviation by comparing the target location corresponding to a signal converted in said step (b) with the current location inputted from said signal converting part; (c-2) converting the deviation to a torque control value; (c-3) subtracting a feedback value of the location control signal from the torque control value, and amplifying and outputting the subtracted value; (c-4) rectifying an output signal of (c-3) and inputting to said driving coil; and (c-5) feeding back and providing the output signal inputted to said driving coil.

Other objects, special merits and novel features of the present invention are more obvious from detailed description and preferred embodiments hereinafter connected with the attached drawings.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 5:
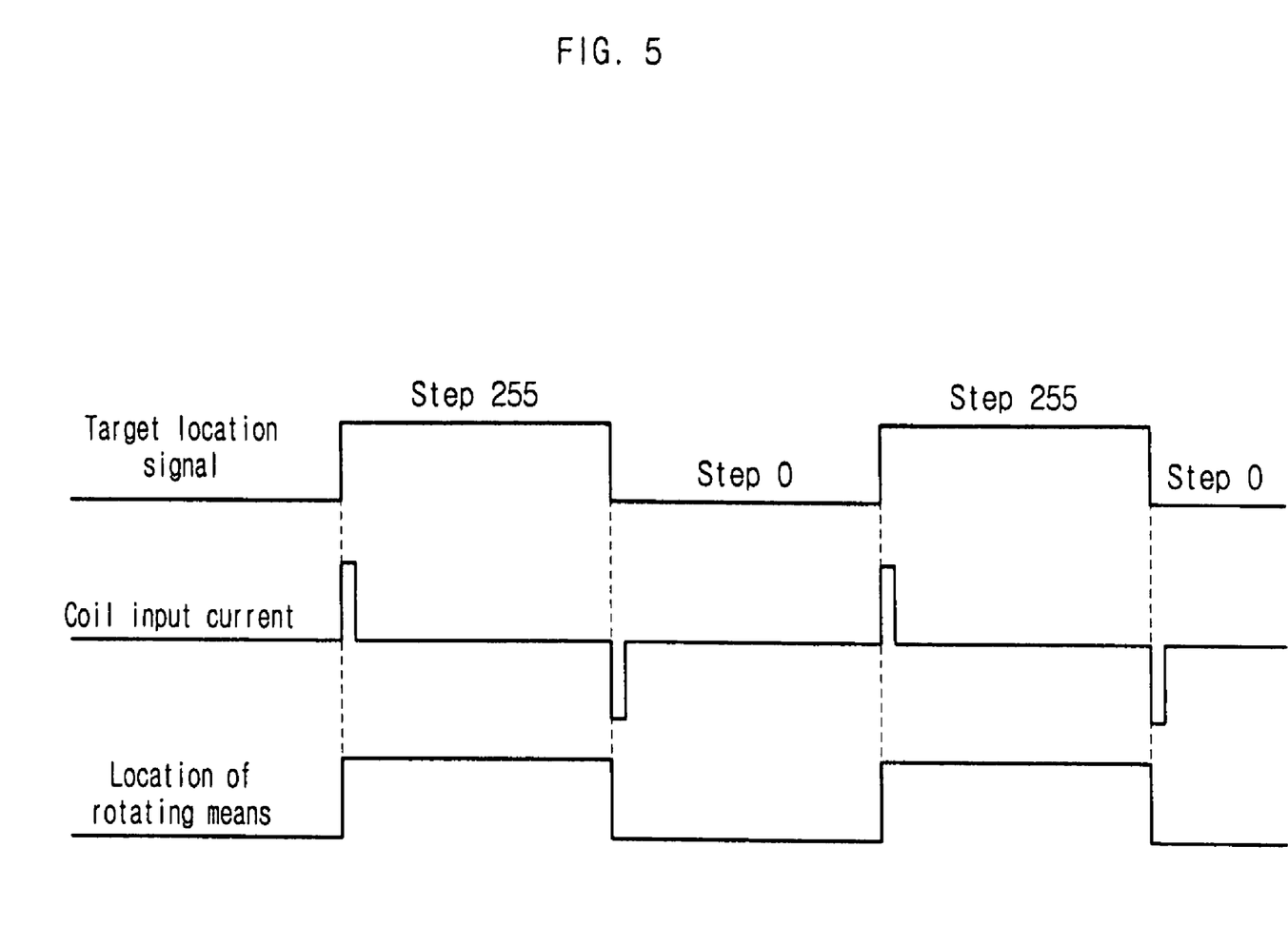
FIG. 5 is a diagram illustrating the time response wave shapes of a target location signal, a coil input current and a real location of rotating means in a conventional dynamic aperture driving apparatus.

FIG. 5 is a diagram illustrating the time response wave shapes of a target location signal, coil input current and real location of rotating means in a conventional dynamic aperture driving apparatus. Referring to FIG. 5, the target location signal sends a signal to go back and forth between step 0 and step 255 periodically. Because the target location signal is a PWM duty signal, it has an input pattern of steps in the case it changes from step 0 to step 255.

If a target location signal is inputted in a conventional dynamic aperture driving apparatus, the target location signal is inputted into a driving control means, as illustrated in FIG. 3. The sensing means detects the current location based on the rotating angle of the rotating means. If step 0, the current location detected by the sensing means, is compared with step 255, the target location by the target location signal, the difference is 255 steps. This means that the rotating means moves from one of the critical locations to another critical location within a predetermined arbitrary angle (e.g., 30 degrees) in order for the rotating means to rotate. Therefore, a coil input current is generated to generate torque such that the rotating means can rotate to a maximum rotating angle corresponding to 255 steps. Here, since the coil input current has the magnitude of the change from step 0 to step 255, the coil input current will be a maximum current. Using the coil input current, the driving magnet 115 and the driving coil 116 comprising the driving means rotate the rotating means instantaneously from one side of the critical locations to the other side by an electromagnetic effect. Hereafter, in the case the target location signal that indicated step 255 changes to step 0, the rotating means of the dynamic aperture driving apparatus rotates from the side of the critical locations, described above, to the original side through a similar process.

If the change cycle of the target location signal from step 0 to step 255, and from step 255 to step 0, is faster than a regular period (for example, 30 ms), the cycle in which the coil input current inputted in the driving coil 116 alternates between the maximum positive(+) current and maximum negative(−) current also becomes faster. This causes the maximum current inputted in the driving coil 116 to play a breaking role, resulting in maximum vibrations.

Figure 6:
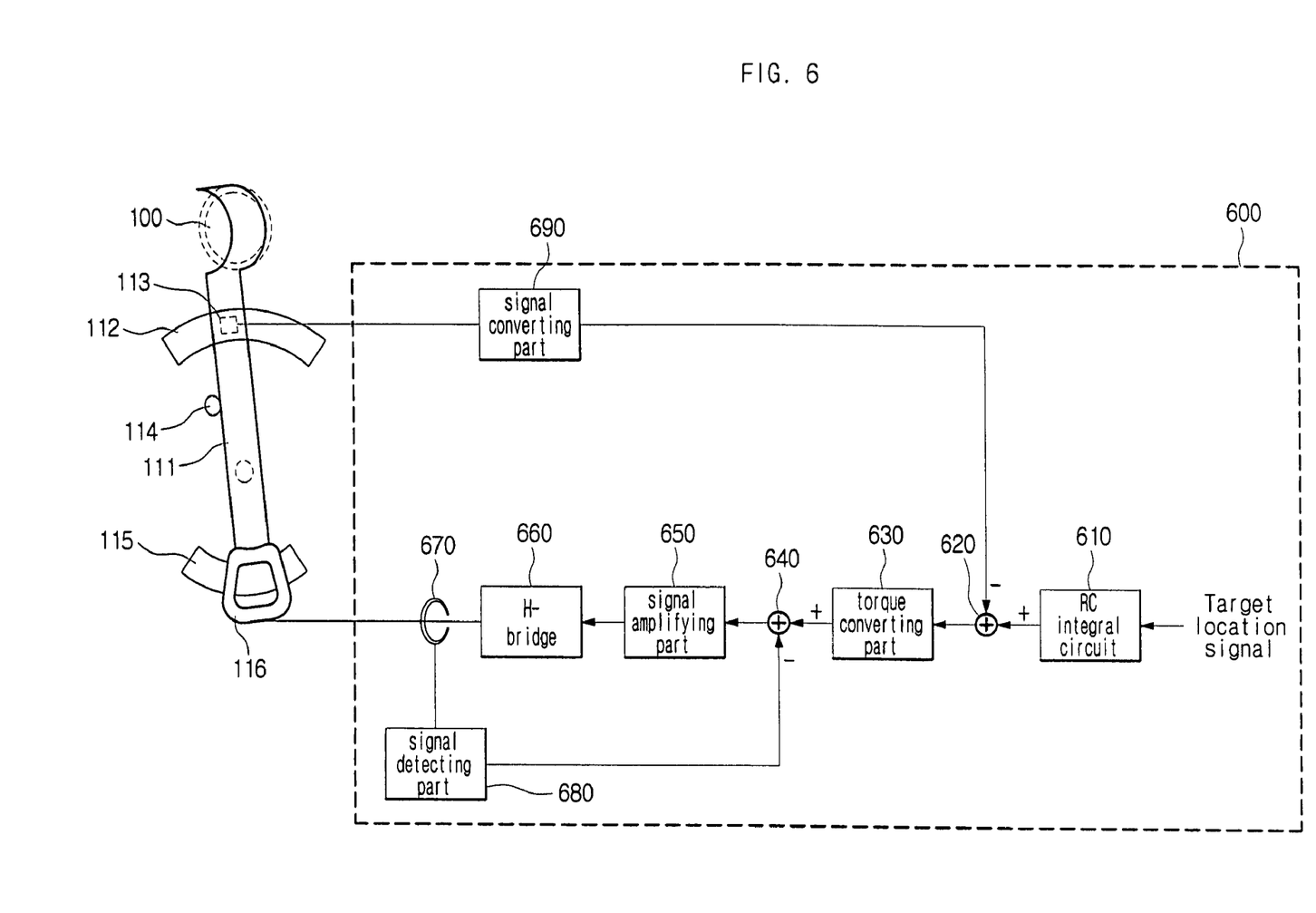
FIG. 6 is a diagram illustrating a dynamic aperture driving apparatus having an RC integral circuit according to a preferred embodiment of the present invention.

A dynamic aperture driving apparatus for preventing this is illustrated in FIG. 6. Referring to FIG. 6, which is a diagram illustrating a dynamic aperture driving apparatus including an RC integral circuit according to a preferred embodiment of the present invention, the dynamic aperture driving apparatus comprises rotating means, driving means, sensing means and driving control means 600.

The upper end of the rotating means is connected to the dynamic aperture in one body, and the rotating means is structured to rotate from one side to the other side in an predetermined rotating angle. The pivot 111 illustrated in FIG. 6 makes up of the rotating means.

The driving means rotates the rotating means from one side to the other side according to an predetermined electric signal. Since precise location control and high resolving power are required, VCM is generally used. In the present invention, the driving means comprises the driving magnet 115 and driving coil 116.

The sensing means detects the current location of rotating means. This is possible because the difference between the current location of the rotating means and the next location to be moved to is identified, and the signal to drive the driving means corresponding to this difference can be generated.

The target location signal is inputted into the driving control means 600. In a projection TV, the dynamic aperture must be driven according to the intensity of light needed in the screen to display. For this, target location signals addressing the location of the dynamic aperture is constantly generated and provided. And the current location of the rotating means detected in the sensing means is compared with the target location of the target location signal. According to the result of the comparison, either a positive(+) or a negative(−) coil input current is generated to control the driving means.

Here, the target location signal is made up of a PWM signal. The PWM signal refers to a Pulse Width Modulation signal, the pattern of which rectangular. In other words, the delay time at the edge, in which the level of the signal changes, is zero. This requires a control of the rapid location change, which generates vibrations, and the delay time at the edge, in which the level of signal changes, is increased to reduce the generation of vibration. For this, the target location signal, which is a PWM signal, is passed through the RC integral circuit to convert the rectangular shaped signal to a trapezoid shaped signal having a slow rising and falling edges.

Figure 7:
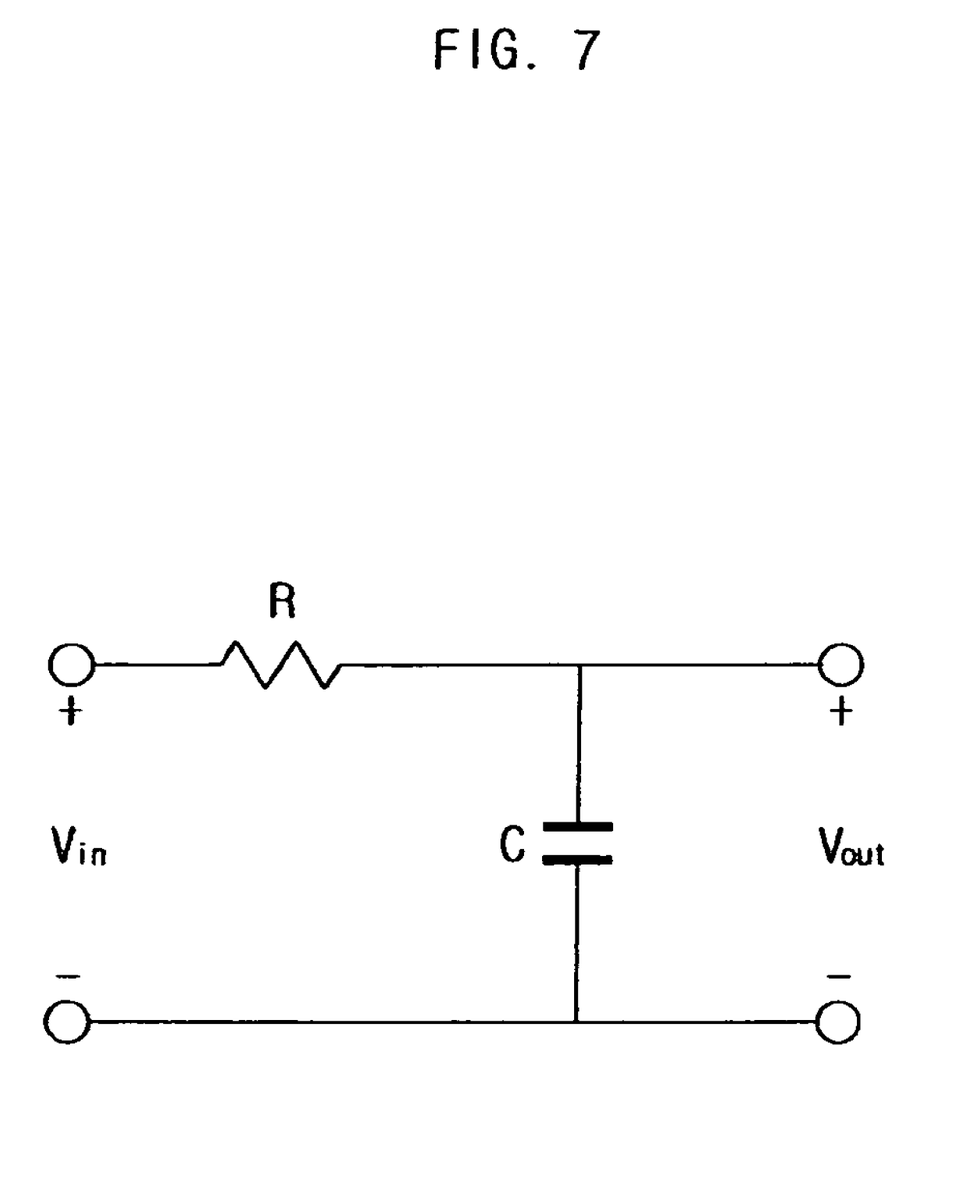
FIG. 7 is the circuit diagram of a basic RC integral circuit.
Figure 8:
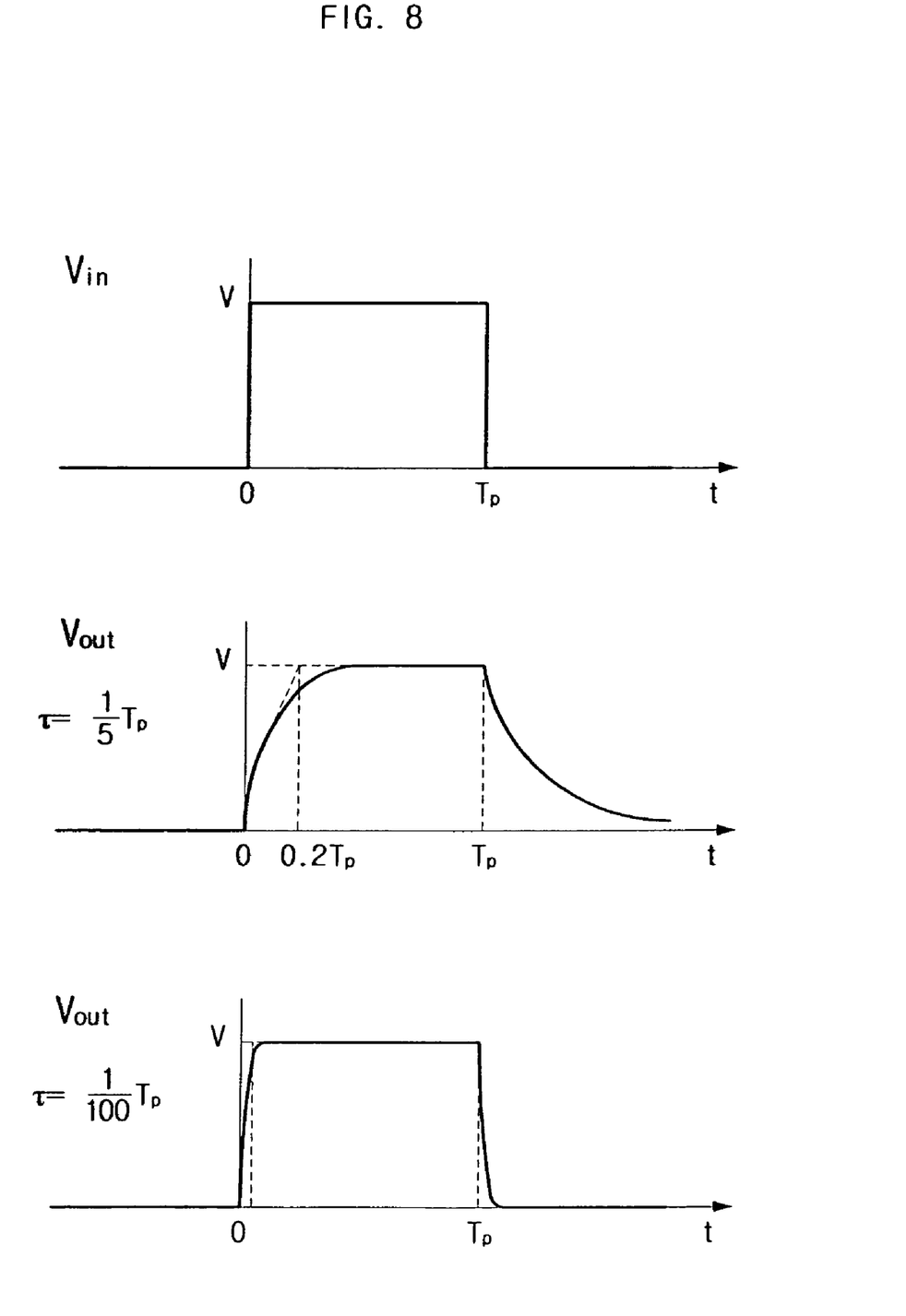
FIG. 8 is a diagram illustrating the step response to the step input of an RC integral circuit.

The principle in which the rectangular shaped signal becomes the trapezoid shaped signal after passing through the RC integral circuit is described hereafter: FIG. 7 is a circuit diagram of a basic RC integral circuit, and FIG. 8 is a diagram illustrating the step response to the step input of an RC integral circuit. Here, the step input is a type of rectangular shaped signal. Referring to FIG. 7, in the RC circuit comprising a resistor R and a capacitor C, the resistor R and the capacitor C are in serial connection, and an input voltage Vin is inputted on both sides of the resistor R and the capacitor C. And the voltage on both sides of the capacitor C is set to Vout. The relationship between Vin and Vout with respect to frequency and time can be described with Eq. 1 and Eq. 2, where Vin is a step input having the value of V.

$$\frac{V_{out}}{V_{in}} = \frac{1}{1+SRC} \qquad <\text{Eq. 1}>$$

$$V_{out} = V - Ve^{-\frac{t}{\tau}}, \tau = RC \qquad <\text{Eq. 2}>$$

Referring to FIG. 8, the step response of Vout based on Eq. 2 is shown. Assuming that Tp signifies the time for which the value of V is maintained in Vin, the step responses shown here are for the cases of τ=Tp/5 and τ=Tp/100. Here, T is a time constant, which is equal to RC in the circuit shown in FIG. 7. A time constant refers to the time for which the output waveform is $e^{-1}$ times (approximately 63.2%) the input waveform.

In the case that the value of a time constant τ is much smaller than that of Tp, an output waveform having a shape similar to the input waveform is generated because the rising time and falling time of the output waveform are very short as described in the case of τ=Tp/100 in FIG. 8. In this case, however, there is a high possibility of producing overshoot. On the other hand, referring to the case of τ=Tp/5 in FIG. 8, an output waveform the rising and falling edges of which are closer to the shape of a trapezoid waveform than that of a rectangular waveform is generated because the rising time and falling time of the output waveform become longer.

In other words, when a target location signal that is a rectangular waveform because of being a PWM signal is passed through the RC circuit illustrated in FIG. 7, the target location signal is converted to a signal whose rising edge and the falling edge are similar to the edges of a trapezoid shaped waveform. Because of this, a target location signal that requires a sudden change of target location can be converted to a target location signal that requires a gradual change of target location.

Figure 9:
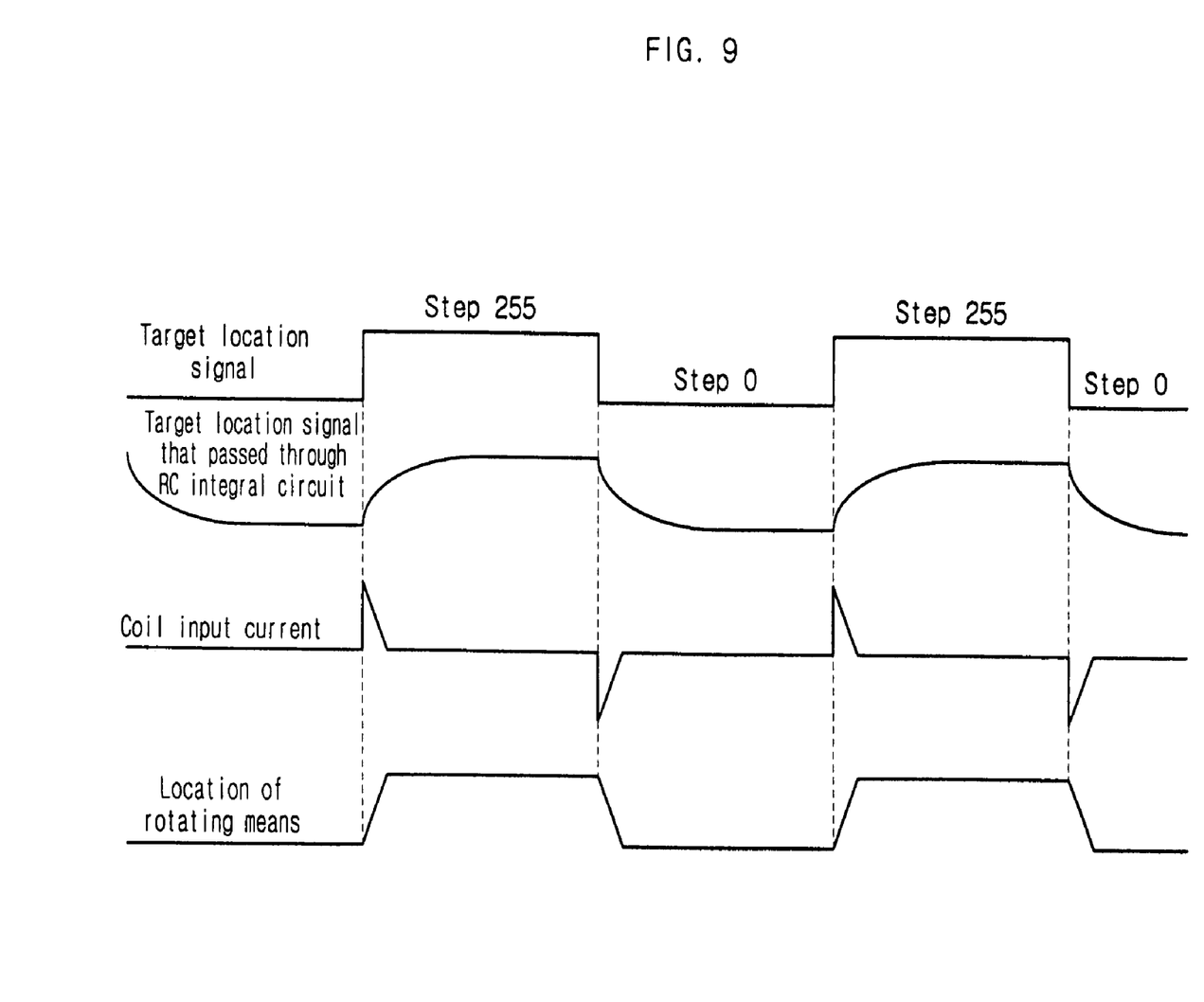
FIG. 9 is a diagram illustrating a target location signal, conversion signal through an RC circuit, coil input current and location of rotating means according to a preferred embodiment of the present invention.

FIG. 9 is a diagram illustrating a target location signal, conversion signal through an RC circuit, coil input current and location of rotating means according to a preferred embodiment of the present invention. Referring to FIG. 9, the target location signal that requires a sudden change from step 0 to step 255, and from step 255 to step 0, is inputted. If the target location signal passes through the RC circuit, as illustrated in FIG. 7, it is converted to a signal having a waveform similar to an output waveform of Vout illustrated in FIG. 8. Although this received command is a change from step 0 to step 255, the dynamic aperture driving apparatus according to a preferred embodiment of the present invention recognizes as if the received command is a change going through a plurality of steps between step 0 and step 255 by the conversion signal having a trapezoid shaped waveform. That is, the current inputted in coil is not a maximum current but the coil input current of a triangular shape, as illustrated in FIG. 8 so as to drive the driving means gradually. Moreover, the rotating means does not rotate suddenly, but rather softly, from one side of the critical location to the other side in the rotating angle.

In other words, the driving means increases the rising time and falling time of the target location signal according to the velocity of the rotating means that is set to keep the vibration from the rotation of the rotating means below a certain level. A sudden rotation of the rotating means causes vibrations in the driving means and rotating means, resulting in the generation of noise. Therefore, a standard for vibration is determined to keep the noise below a certain level, and a velocity of the rotating means is set to keep the vibration from rotation below the standard. And according to the set velocity of the rotating means, namely keeping the rotation velocity below the set velocity, the target location signal similar to a rectangular waveform is converted to a signal similar to a trapezoid waveform by increasing the rising time and falling time of the target location signal. This, if the velocity of the rotating means is kept below the set velocity, keeps the vibration, as well as the noise, below the standard.

The dynamic aperture driving apparatus is equipped in an optical apparatus inside a projection TV or a projector and controls the intensity of incident light. In the case of displaying a scene of lightning on screen, the dynamic aperture driving apparatus commands to suddenly change the level of target location signal from step 0 to step 255, and from step 255 to step 0, and the cycle of the change is above 30 Hz. In this case, the driving apparatus of a conventional dynamic aperture generates big vibrations, and the noise from the vibration inside of the optical apparatus is measured over 40 dB. On the other hand, in a dynamic aperture driving apparatus according to a preferred embodiment of the present invention, the noise becomes below 20 dB if the RC integral circuit comprises like hereafter. In the RC circuit illustrated in FIG. 7, if the resistor R and the capacitor C are set such that the RC value of a time constant T is 0.002 and three RC circuits are in serial connection, the RC circuit becomes the third low pass filter, improving the property of frequency blocking, and the vibration of the driving apparatus is reduced. In this case, the rising time or falling time is about 15 ms, satisfying the standard.

The driving means of a dynamic aperture driving apparatus according to a preferred embodiment of the present invention can generally be VCM. The driving means can comprise a driving coil, which is formed in one body with the rotating means and in which the location control signal generated by the driving control means is inputted, and a driving magnet, which is installed with a gap from the driving coil and causes an electromagnetic effect with the driving coil.

The driving control means of a dynamic aperture driving apparatus according to another preferred embodiment is illustrated in FIG. 6. The driving control means 600 comprises a signal converting part 690, an RC integral circuit 610, a first operating part 620, a torque converting part 630, a second operating part 640, a signal amplifying part 650, an H-bridge 660 and a signal detecting part 680.

The signal converting part 690 converts the value on the current location detected in the sensing means to a voltage signal. The RC integral circuit 610 increases the rising time and falling time of a target location signal inputted in the driving control means. In other words, it converts the signal of a rectangular waveform to a signal of a trapezoid waveform. The first operating part 620 calculates a deviation by comparing the voltage value of a target location corresponding to the target location signal converted to increase the rising time and falling time of the target location signal through the RC integral circuit 610 with the voltage value of the current location inputted from the signal converting part 690. The torque converting part 630 converts an output signal corresponding to the deviation calculated in the first operating part 620 to a torque control value to control the driving means. The second operating part 640 subtracts the feedback value of the location control signal from the output value of the torque converting part 630. The signal amplifying part 650 amplifies an output of the second operating part 640. The H-bridge 660 rectifies an output signal of the signal amplifying part 650, namely the location control signal, and inputs the output signal to control the driving means in the driving coil. The signal detecting part 670 feeds back the location control signal inputted in the driving coil to provide to the second operating part 640.

The sensing means of a dynamic aperture driving apparatus can be embodied in a simple structure using the hall sensor according to the principle of hall effect.

According to an embodiment, the sensing means can comprise a sensor magnet 112, which is placed parallel to the rotating route of the rotating means and changed linearly according to the direction of length of the sensor magnet to provide different magnet intensities according to each rotating angle of the rotating means, and a hall sensor, which rotates in one body with the rotating means and converts a magnetic intensity of the sensor magnet 112 changing according to the rotating angle of the rotating means to an electric signal.

According to another embodiment, the sensing means comprises a sensor magnet (not illustrated), which is placed to a predetermined location such that a gap between the rotating means and the predetermined location is changed by the rotation of the rotating means and has a constant magnetic intensity, and a hall sensor, which rotates in one body with the rotating means and converts a magnetic intensity of the sensor magnet changing according to the rotating angle to an electric signal.

The present invention is not limited by the embodiments, and those skilled in the art will recognize that many other implementations are possible, consistent with the present invention. Furthermore, the scope of the present invention is defined by only the appended claims.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

According to the present invention comprised as above mentioned, a dynamic aperture driving apparatus and method for reducing vibration can remove the generation of vibration when the control input is a pulse.

Noise can be reduced in a projection TV because of the reduced generation of vibration.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A dynamic aperture driving apparatus for controlling the intensity of incident light by rotating a dynamic aperture, said dynamic aperture driving apparatus comprising:

rotating means, the upper end of which is connected with said dynamic aperture to rotate from one side to the other side in a predetermined rotating angle;

driving means for rotating said rotating means from one side to the other side according to a predetermined electric signal;

sensing means for detecting a current location of said rotating means; and driving control means for comparing a target location corresponding to an inputted target location signal with said current location detected by said sensing means and making a location control signal control said driving means such that said rotating means reaches the target location, wherein said driving control means increases a rising time and falling time of the target location signal, according to a speed of said rotating means set up to keep vibrations produced by rotation of said rotating means below a certain level.

2. The dynamic aperture driving apparatus of claim 1, wherein said driving means comprises:

a driving coil formed in one body with said rotating means and in which the location control signal generated by said driving control means is inputted; and a driving magnet installed with a gap from said driving coil.

3. The dynamic aperture driving apparatus of claim 2, wherein said driving control means comprises:

a signal converting part for converting a value of the current location detected by said sensing means to a voltage signal;

an RC integral circuit for increasing the rising time and falling time of the inputted target location signal;

a first operating part for calculating a deviation by comparing the target location corresponding to the target location signal of which the rising time and falling time increase through said RC integral circuit with the current location inputted from said signal converting part;

a torque converting part for converting an output signal of said first operating part to a torque control value;

a second operating part for subtracting a feedback value of the location control signal from an output value of said torque converting part;

a signal amplifying part for amplifying an output of said second operating part;

an H-bridge for rectifying an output signal of said signal amplifying part and inputting the output signal to said driving coil; and a signal detecting part for providing the output signal on said driving coil to said second operating part by feedback.

4. The dynamic aperture driving apparatus of claim 1, wherein said sensing means comprises:

a sensor magnet placed parallel to a rotating route of said rotating means and providing a magnetic intensity which is changed linearly along the length direction of said sensor magnet and is different according to each rotating angle of said rotating means; and a hall sensor for rotating in one body with said rotating means and converting the magnetic intensity of said sensor magnet changed according to the rotating angle to an electric signal.

5. The dynamic aperture driving apparatus of claim 1, wherein said sensing means comprises:

a sensor magnet placed to a predetermined location such that a gap between said rotating means and said predetermined location is changed by rotation of said rotating means and having a fixed magnetic intensity; and a hall sensor for rotating in one body with said rotating means and converting the magnetic intensity of said sensor magnet changed according to a rotating angle to an electric signal.

6. A method for reducing vibration of a dynamic aperture driving apparatus comprising rotating means, the upper end of which is connected with a dynamic aperture to rotate from one side to the other side in a predetermined rotating angle, driving means for rotating said rotating means from one side to the other side according to a predetermined electric signal, sensing means for detecting a current location of said rotating means and driving control means for comparing a target location corresponding to an inputted target location signal with the current location detected by said sensing means to generate a location control signal controlling said driving means such that said rotating means reaches the target location, the method comprising:

(a) inputting the target location signal to said driving control means;

(b) converting the target location signal to a signal a rising time and falling time of which increase through an RC integral circuit;

(c) comparing a current location detected by said sensing means with the target location by the converted signal in said step (b) and generating the location control signal to control said driving means such that said rotating means reaches the target location; and (d) rotating said rotating means by said driving means according to the location control signal.

7. The method of claim 6, wherein said driving means comprises:

a driving coil formed in one body with said rotating means to input said location control signal generated by said driving control means; and a driving magnet installed with a gap from said driving coil.

8. The method of claim 7, wherein said step (c) comprises:

(c-1) calculating a deviation by comparing the target location corresponding to a signal converted in said step (b) with the current location inputted from said signal converting part;

(c-2) converting the deviation to a torque control value;

(c-3) subtracting a feedback value of the location control signal from the torque control value, and amplifying and outputting the subtracted value;

(c-4) rectifying an output signal of (c-3) and inputting to said driving coil; and (c-5) feeding back and providing the output signal inputted to said driving coil.

* * * * *